Figure 1:
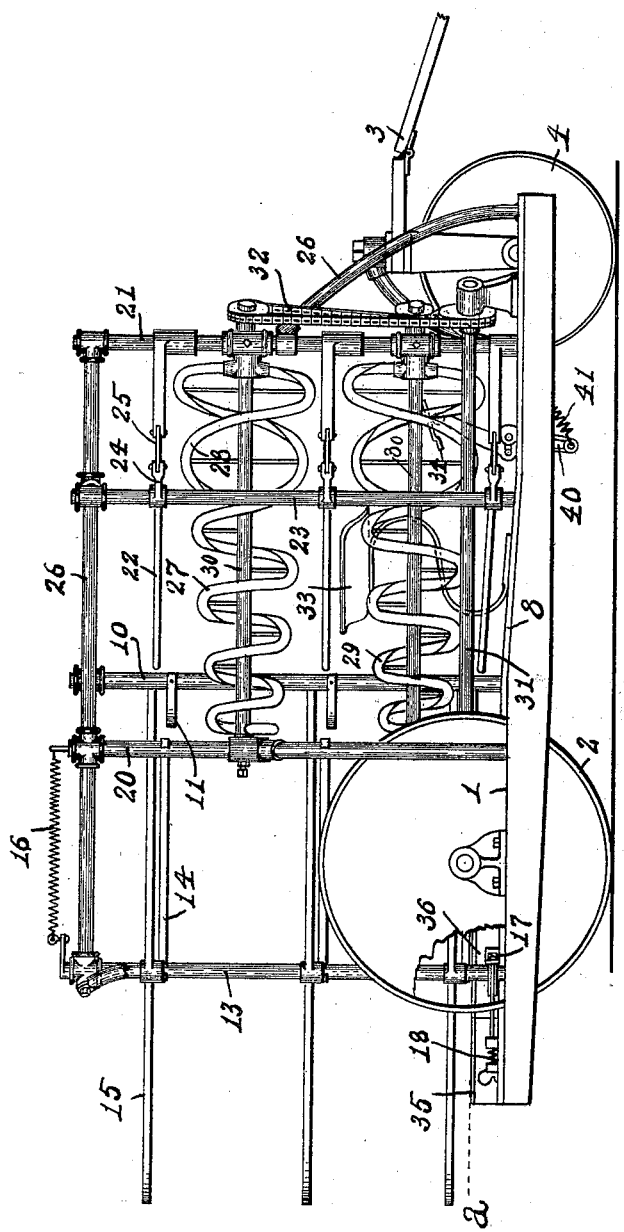

No. 624,668. Patented May 9, 1899.
J. A. MOORE, G. COTNER & T. J. OBENCHAIN.
CORN HARVESTER.
(Application filed Jan. 26, 1898.)

(No Model.) 3 Sheets—Sheet 1.

Witnesses:
E. R. Shipley
M. S. Belden

James A. Moore
George Cotner
Thomas J. Obenchain
Inventors by James W. See
Attorney No. 624,668. Patented May 9, 1899.
J. A. MOORE, G. COTNER & T. J. OBENCHAIN.
CORN HARVESTER.
(Application filed Jan. 26, 1898.)
(No Model.) 3 Sheets—Sheet 2.
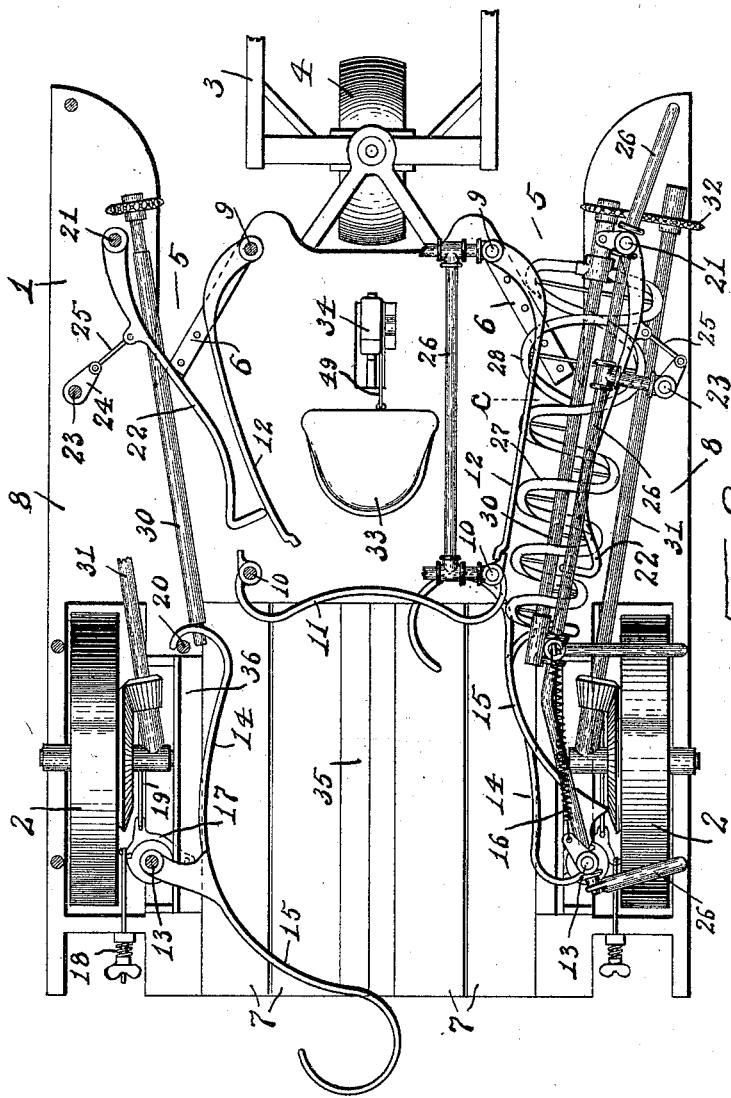
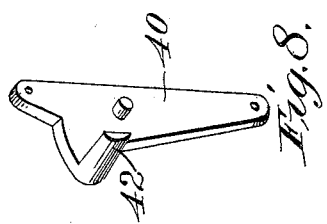
Witnesses:
E. R. Shipley.
M. S. Belden.
James A. Moore
George Cotner
Thomas J. Obenchain
Inventors
by James W. See
Attorney No. 624,668. Patented May 9, 1899.
J. A. MOORE, G. COTNER & T. J. OBENCHAIN.
CORN HARVESTER.
(Application filed Jan. 26, 1898.)
(No Model.) 3 Sheets—Sheet 3.
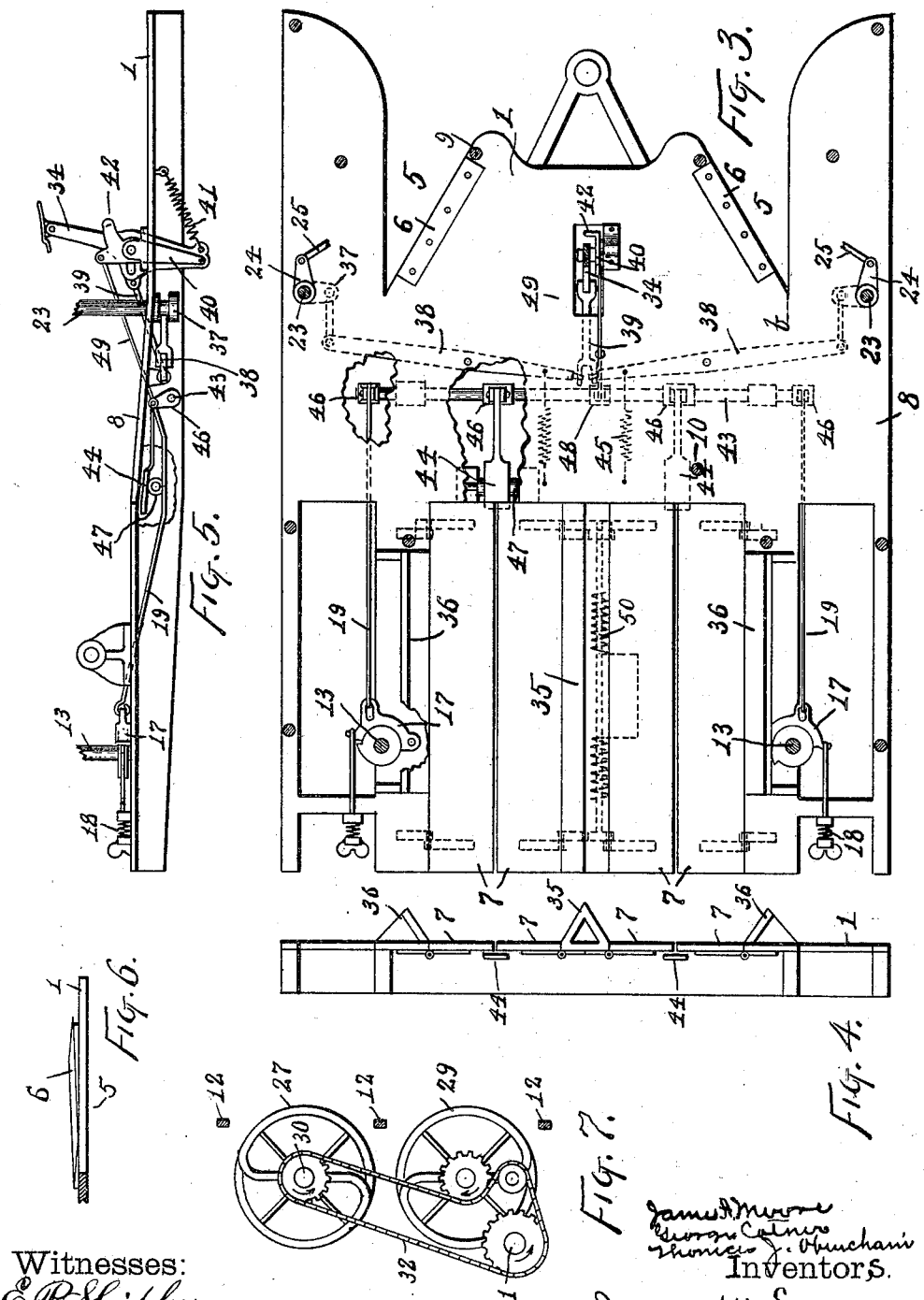

UNITED STATES PATENT OFFICE.

JAMES A. MOORE, GEORGE COTNER, AND THOMAS J. OBENCHAIN, OF LOGANSPORT, INDIANA; SAID MOORE AND OBENCHAIN ASSIGNORS TO SAID COTNER.

CORN-HARVESTER.

SPECIFICATION forming part of Letters Patent No. 624,668, dated May 9, 1899.

Application filed January 26, 1898. Serial No. 667,977. (No model.)

*To all whom it may concern:*

Be it known that we, JAMES A. MOORE, GEORGE COTNER, and THOMAS J. OBENCHAIN, of Logansport, Cass county, Indiana, have invented certain new and useful Improvements in Corn-Harvesters, of which the following is a specification.

This invention relates to improvements in implements for harvesting corn; and the improvements will be readily understood from the following description, taken in connection with the accompanying drawings, in which—

Figure 1 is a side elevation of a corn-harvester exemplifying our invention; Fig. 2, a plan of the same, showing the right-hand group of members in normal gathering position, while numerous members of the left-hand group are omitted, the cut-off being shown in action and the discharge-gate being shown as opening; Fig. 3, a plan of the deck of the implement; Fig. 4, a rear end view of the deck; Fig. 5, a side view of the deck with side timbers removed to more clearly expose the mechanism below the deck; Fig. 6, a side view of one of the cutters; Fig. 7, a front elevation of the left-hand group of conveying devices, and Fig. 8 a perspective view of the secondary foot-lever 40.

The implement comprises a deck mounted on wheels and provided with draft apparatus, the front of the deck having two angular notches and knives to attack two rows of corn at once, conveyers engaging the cut corn and carrying it rearwardly while vertical to a rear portion of the deck formed with trap-doors and provided with supporting-fences and yielding gates forming a bundling-chamber in which when the chamber is full the corn is bound, after which the trap-doors and the rear gates open to permit the shock to descend to the ground in standing condition and the machine to move forward, leaving the shock standing, a cut-off being provided to interrupt the movement of corn into the bundling-chamber while the corn therein is being bound. The implement being a double one—that is to say, arranged to attack two rows of corn at once—the right-hand and left-hand group of members are duplicates of each other, and in the following description it may often happen that a member described in the singular will be found in duplicate.

In using the expressions "right" and "left" reference is had to the right and left hand side of the driver as he sits upon the implement.

In connection with the following description it may be well to give, primarily, attention to Fig. 2.

In the drawings, 1 indicates the deck of the implement; 2, the rear wheels thereof, the same being ground-wheels adapted to give motion to conveying mechanism as they turn; 3, draft devices, illustrated as thills; 4, a swiveled or wheel caster forming the front wheel of the implement, the same being pivoted at the central front portion of the deck; 5, forwardly-open angular notches in the front end of the deck at such distance apart as to properly engage two rows of standing corn; 6, a cutter disposed along one shore of each of these notches, the forward ends of these cutter-blades being higher than the rear ends, as indicated in Fig. 6, so that the blade attacks the corn at the beginning of its cutting at a higher level than at the finish of the cutting, thus somewhat compensating for the forward deflection of the corn while being cut and producing a peculiar draw-cutting action on the corn; 7, two pairs of hinged trap-doors forming the rear portion of the deck and forming the floor of the bundling-chamber, their hinge-axes extending fore and aft, the hinged edges of the inner doors of the pairs being near the transverse center of the deck and the hinged edges of the outer doors being at the side limits of the bundling-chamber, so that as the doors swing downwardly they will form two downwardly and rearwardly open slots in the deck; 8, that portion of the deck extending from the rear of notches 5 to the plane of the forward ends of the trap-doors, this portion of the deck inclining somewhat upwardly and rearwardly, as seen in Figs. 1 and 5; 9, a pair of fixed posts rising from the deck at the forward ends of the cutter-blades; 10, a pair of fixed posts rising from the deck just forward of the trap-doors and in about fore-and-aft line with posts 9; 11, the front fence of the bundling-chamber, formed by transverse bars having their ends secured to posts 10, the fence thus formed being of such height as to give proper support to the corn standing in the bundling-chamber, the illustration showing this fence 11 as being composed of three of the horizontal bars, as seen in Fig. 1; 12, the inner fences of the corn-passages, extending from the cutting-blades rearwardly to the bundling-chamber, which passages will be hereinafter termed the "gullets," these fences being formed of bars secured at their front ends to the posts 9 and extending rearwardly into outward engagement with the outer extremities of fence 11, the bars being flexible, so that their rear ends may be forced inwardly, and the forward portions of the bars being curved to form a flared mouth to the gullet, Fig. 2 showing the right-hand one of these fences as in normal position with its rear end in engagement with fence 11, while the left-hand fence is shown as having its rear end flexed inwardly; 13, a pair of posts projecting upwardly from the rear portion of the deck and located outwardly beyond the bundling-chamber, these posts being supported in bearings, so as to be capable of turning; 14, the side fences of the bundling-chamber, the same being formed of horizontal bars having their rear ends engaging and supported by the posts 13, their forward ends being outwardly curved and supported by posts 20, the curved front portions of the fences 14 being such a distance from the side extremities of fence 11 as to form between them passage-ways from the gullets into the bundling-chamber; 15, the gates of the bundling-chamber, the same being formed of horizontal bars secured to posts 13 and extending, when the bundling-chamber is full, from the rear of side fences 14 around to the rear of the bundling-chamber, as seen at the left-hand gate 15 in Fig. 2, these gates being capable of swinging forward, as seen at the right-hand gate of Fig. 2, so as to form, when in that position, a yielding rear wall across the gullet, the gates being also capable of swinging outwardly from the position of the left-hand gate in Fig. 2, so as to permit the discharge of the shock; 16, springs drawing on arms on posts 13 and tending to turn the posts and pull the gates into the position of the right-hand gate in Fig. 2; 17, brake-pads bearing on the periphery of disks on posts 13 and serving to furnish a frictional resistance to the turning of the posts; 18, a spring connected with each of the brake-pads 17 and provided with an adjusting-screw by means of which its tension may be altered, the springs serving to draw the brake-pads elastically to their work; 19, rods attached to the brake-pads and extending forwardly and serving, when drawn forward, to pull upon the brake-pads against the resistance of the brake-springs and to thus relieve the braking action upon posts 13; 20, the posts rising from the deck and supporting the rear portions of side fences 14; 21, posts rising from the forward portion of the deck outwardly beyond notches 5; 22, cut-off bars in the horizontal planes of the bars forming fences 12 and disposed outwardly beyond the fences 12, the forward ends of bars 22 being pivoted on posts 21, so that bars 22 are capable of occupying an outer position outside the gullet, as at the right hand in Fig. 2, and capable also of swinging inwardly against fences 12 and flexing those fences inwardly, as at the left hand in Fig. 2, the rear ends of bars 22 being turned inwardly, so that in making contact with fences 12 and in flexing those fences inwardly a false gullet or cul-de-sac will be formed between bars 22 and fences 12; 23, posts extending up from the deck outwardly beyond bars 22 and mounted for turning motion; 24, arms fast on posts 23 in the horizontal planes of cut-off bars 22; 25, links connecting arms 24 with cut-off bars 22, whereby the turning of posts 23 will cause inward and outward movement of the cut-off bars; 26, Fig. 1, bars connected with the various posts and with the posts serving to form the general frame of the implement above the deck. 27, (best seen in Fig. 1,) a frusto-conical conveyer formed of a helically-coiled bar secured by suitable spokes to an axial shaft, the rear end of the coil being the smaller and the pitch of the helix decreasing from the front to the rear end, this helical conveyer having its shaft mounted in appropriate bearings on posts 20 and 21 at a height about midway between the upper and middle bars of fence 12 and cut-off 22 and at such distance outwardly from fence 12 that the shaft of the conveyer will form an outer fence for the gullet, the rear end of the shaft of the conveyer reaching to the forward extremity of fence 14, it being understood that while this conveyer has been spoken of in the singular there is one at the right and one at the left of the implement; 28, an additional coiled bar at the forward end of conveyer 27, this coil extending only part way back upon the conveyer, and thus causing the conveyer to have a "double thread," so to speak, at its forward end; 29, a second helical conveyer, like the one previously mentioned, but of opposite spirality and mounted lower down, so as to lie in a horizontal plane between those of the middle and lower bars of fence 12 and cut-off 22, Fig. 7, which is a front end view of the left-hand-conveyer system, best showing the relationship of the two conveyers to each other and to the bars of the fence 12; 30, the shafts of the helical conveyers; 31, shafts mounted in appropriate bearings on the deck and having their rear ends geared to ground-wheels 2, these shafts extending forwardly parallel with the shafts of the helical conveyers; 32, chain-and-sprocket gearing connecting shafts 31 with the shaft of the helical conveyers, so that as the implement is drawn forward the helical conveyers are caused to turn, Fig. 7 best illustrating the arrangement of the transmitting-gearing and showing that the inner or active portion of the upper conveyer travels upward while the corresponding portion of the lower conveyer travels downward; 33, the driver's seat, disposed centrally upon the deck, forward of fence 11; 34, a foot-lever within reach of the driver's foot, the pivot of this lever being at its lower end and instead of being in fixed position carried on the lower end of a secondary lever 40, as hereinafter described; 35, a low fore-and-aft ridge disposed centrally on the deck between the two pairs of trap-doors; 36, inclined fender-boards disposed upon the deck outside the trap-doors and serving to prevent the bases of cornstalk in the bundling-chamber from getting tangled in the gearing and brake mechanism, the central ridge and fender-boards being best seen in Fig. 4; 37, (Figs. 3 and 5, which figures may now best serve in connection with the description,) arms fast on the lower ends of posts 23, being the posts which operate the cut-off bars 22; 38, a pair of levers pivoted below the deck and having their outer ends linked to arms 37, the inner ends of these levers being near each other; 39, a link connected with foot-lever 34 and with the inner ends of both of levers 38, so that if the upper portion of foot-lever 34 be pressed forward the posts 23 will be turned and the cut-off bars 22 moved inwardly to the position shown at the left in Fig. 2; 40, a secondary lever disposed alongside foot-lever 34, this secondary lever being mounted on a pivot carried fixedly by the deck, the lower end of this secondary lever carrying the pivot on which is mounted foot-lever 34, foot-lever 34 being segmentally slotted to permit it to oscillate without being interfered with by the supporting-pivot of secondary lever 40, the construction being obviously such that secondary lever 40 oscillates on a fixed pivot carried by the deck, while foot-lever 34 oscillates on a movable pivot carried by the lower end of the secondary lever; 41, a spring connected with the lower end of the foot-lever 34 and serving to draw and hold the lower ends of foot-lever 34 and secondary lever 40 forward; 43, a spur projecting sidewise from the upper portion of secondary lever 40 in front of the upper portion of foot-lever 34 and normally some distance forward of the foot-lever, so that if foot-lever 34 be pushed forward it will move independent of the secondary lever until the foot-lever comes in contact with spur 42, after which the continued forward movement of the foot-lever will be accompanied by a forward movement of the upper end of the secondary lever; 43, a rock-shaft mounted below and across the deck to the rear of the foot-lever; 44, sliding bolts mounted below the deck and having their rear ends engaging under the forward ends of trap-doors 7 and holding those trap-doors in normal closed position, so that they form the floor of the bundling-chamber; 45, springs connected with the inner ends of levers 38 and serving to yieldingly hold the levers in position corresponding with the normal inactive outer position of cut-off bars 22; 46, arms fast upon rock-shaft 43, two of these arms having connected to them the forward ends of trap-door bolts 44 and two of them having connected to them the forward ends of brake-relieving rods 19, so that the turning of the rock-shaft may withdraw the bolts and relieve the brakes; 47, rollers under the rear ends of the trap-door bolts 44 to permit the easy withdrawal of the bolts; 48, an additional arm fast upon rock-shaft 43; 49, a link connecting arm 48 with the upper arm of secondary lever 40, so that as the secondary lever is rocked by the continued forward motion of foot-lever 34 the rock-shaft will be turned to operate the rods of the trap-door bolts and the brake-relief, and 50 springs at the hinges of the trap-door, serving to hold the doors yieldingly in normal closed position, the drawings showing the springs at but one of the doors, as all are alike.

Turning now to Fig. 2, the trap-doors are normally closed and held latched by their bolts. Cut-off bars 22 occupy their idle outermost position, as at the right in Fig. 2. Fences 12 normally occupy their outer position, as at the right in Fig. 2. Gates 15 normally occupy their forward position, as at the right in Fig. 2, and are yieldingly held in that position by springs 16. Gullets are thus formed between fences 12 and the shafts of the helical conveyers. The coils of the conveyers project inwardly across these gullets. The gullets lead from the vertical plane of notches 5 rearwardly into the bundling-chamber. Both gullets are closed at the rear by gates 15, which are capable of yielding rearwardly. The springs 16 and the brakes 17 yieldingly resist the rearward movement of the gates, and as the implement is drawn forward the helical conveyers are in rotary motion.

The implement advances upon the corn-rows, which enter the mouths of the gullets and become engaged by the forward coils of the conveyers, whose degree of spirality is such as to produce upon the corn a rearward-translation effect somewhat in excess of correspondence with the forward movement of the implement, the effect being to sustain the cornstalks in vertical position and feed them rearwardly in the gullets, the cutter-blades severing the bases of the stalks with a drawing cut. The severed stalks thus maintained in vertical position are carried rearwardly through the gullets and are elevated somewhat by the rearwardly-inclining portion 8 of the deck. The cornstalks thus carried rearwardly are forced against the gullet-obstructing portions of gates 15, the coils of the conveyers acting as compressing agents. The rearwardly-decreasing pitch of the coils of the conveyers, in conjunction with their rearwardly-tapering form, serves in increasing the compressing effect as the stalks move rearwardly, the forward coarse turns of the conveyers acting as rapid gatherers, while the finer rear turns of the conveyers act as slower compressors. The "extra" or "second" thread, so to speak, provided at the forward portions of the conveyers gives to that portion of the conveyers the "qualities," so to speak, of fine threads with coarse pitches, thus avoiding the lack of back and front support to the cornstalks, which might result with a single thread of great pitch. The lifting and depressing effect of the two conveyers of a pair upon the stalks is rendered *nil* by reason of the relatively opposite directions of rotation of the two conveyers of the pair.

As the stalks become compressed against gates 15 those gates yield rearwardly, thus admitting the stalks to the bundling-chamber and providing the bundling-chamber with a yielding rear wall, the free ends of the gates overlapping each other as the bundling-chamber expands in size by the rearward movement of the gates. The rearward movement of the gates is resisted by the brakes, and the degree of pressure on the brakes, as determined by adjustable springs 18, determines the degree of compactness given to the stalks in the bundling-chamber. Each gullet delivers stalks into the bundling-chamber at its appropriate side of the central ridge 35. When the bundling-chamber is full, the gates will occupy the positively-arrested position indicated by the one at the left in Fig. 2, and at this time the entry of stalks to the bundling-chamber is to be arrested while the corn in the chamber is being bound and discharged.

When the bundling-chamber is properly filled, then the driver will press forward on foot-lever 34. Turn now to Figs. 3 and 5. The first effect of the foot-pressure is to move only foot-lever 34 forward, thus rocking levers 38 and turning posts 23 and swinging the cut-off bars 22 inwardly, as at the left in Fig. 2, the cut-off bars thus moving across the gullets and forming temporary outer fences for the gullets and temporarily closing the rear ends of the gullets, fences 12 at the same time flexing inwardly, so that the gullets themselves become deflected inwardly at the rear and less within the influence of the coils of the conveyers. The rearwardly-moving stalks now go into the temporary false gullets. The stalks in the bundling-chamber having been properly bound, the driver puts additional pressure upon foot-lever 34, (see Fig. 5,) the result being that the foot-lever strikes spur 42 and causes the upper arm of secondary lever 40 to move forward, thus withdrawing the trap-door bolts 44, whereupon the weight of the shock forces the trap-doors down and open, the shock thus settling to the ground and having its base split by ridge 35, so as to give the shock a substantial base upon the ground. The effect of the additional pressure upon the foot-lever was also to release the arresting and resisting brakes 17, thus leaving the gates 15 only under the resisting influence of springs 16. Under these conditions the implement moves forward and the gates yield rearwardly and outwardly and pass the shock, which is thus left firmly standing upon the ground, springs 16 returning the gates to extreme forward position and the trap-door springs 50 returning the trap-doors to normal closed position as soon as the shock is discharged. The release of the foot-lever permits the trap-door bolts to again go to latching position and permits the brake-pads to again go to braking position, and as the foot-lever moves rearwardly springs 45 cause the turning of posts 23, whereupon cut-off bars 22 go back to idle outward position and fences 12 take up their normal position and the temporary false gullets become abandoned in favor of the normal gullets leading into the bundling-chamber, the accumulation of stalks in the false gullets being shifted outwardly by the outward movement of fences 12, and thus brought into the normal gullets and under the influence of the conveyers.

In practice we have thus far constructed the posts and general upper frame members of our implement of tubing, thus giving a light and inexpensive superstructure of skeleton form and well adapted for the intended purposes. It is to be understood, of course, that we have set forth our invention in the best mode in which we have contemplated applying it, and that therefore the specific structure set forth is merely an exemplification of our invention and is susceptible of many structural modifications in the hands of those skilled in the art.

We claim as our invention—

1. In a corn-harvester, the combination, substantially as set forth, of a pair of horizontal bars forming a gullet-fence, a horizontal shaft disposed alongside said bars and in a horizontal plane between the bars and forming the second gullet-fence, and a helical conveying-coil carried by said shaft and having its diameter decreasing from the initial end of said gullet.

2. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices, a horizontally-disposed conveyer-shaft mounted in bearings on the deck alongside said fence, a helical conveying-coil carried by said shaft and coöperating with said fence to carry the stalks rearwardly and having the pitch of its helix decreasing rearwardly, and mechanism connecting the conveyer-shaft with supporting-wheels of the deck.

3. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices, a horizontally-disposed conveyer-shaft mounted in bearings on the deck alongside said fence, a helical conveying-coil carried by said shaft and coöperating with said fence to carry the stalks rearwardly and having its diameter lessening rearwardly and having the pitch of its helix decreasing rearwardly, and mechanism connecting the conveyer-shaft with supporting-wheels of the deck.

4. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices, a horizontally-disposed conveyer-shaft mounted in bearings on the deck alongside said fence, a helical conveying-coil carried by said shaft and coöperating with said fence to carry the stalks rearwardly and having the spirality of its helix decreasing rearwardly, a second helical coil carried by the forward end of said shaft and extending but a portion of the length of the first-mentioned coil, said coils together forming a helix with double initial coils and single terminal coil, and mechanism connecting the conveyer-shaft with supporting-wheels of the deck.

5. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices, a horizontally-disposed conveyer-shaft mounted in bearings on the deck alongside said fence, a helical conveying-coil carried by said shaft and coöperating with said fence to carry the stalks rearwardly and having its diameter lessening rearwardly and having the pitch of its helix decreasing rearwardly, a second helical coil carried by the forward end of said shaft and extending but a portion of the length of the first-mentioned coil, said coils together forming a helix of rearwardly-lessening diameter and having double initial coils and a single terminal coil, and mechanism connecting the conveyer-shaft with supporting-wheels of the deck.

6. In a corn-harvester, the combination, substantially as set forth, of a gullet-fence formed of three horizontal bars, a pair of horizontal shafts disposed alongside said bars in horizontal planes between those said bars and forming the second gullet-fence, and helical conveying-coils carried by said shafts and having their peripheries projecting to and between said bars, the diameters of said coils decreasing from the initial end of said gullet.

7. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices and formed of a vertical series of horizontal bars, a pair of horizontally-disposed conveyer-shafts disposed one over the other and alongside said fence in horizontal planes between those of bars of said fence, helical conveying-coils carried by said shafts and having their peripheries projecting to and between the fence-bars, and mechanism connecting the conveyer-shafts with supporting-wheels of the deck, the pitch of the helices of said conveying-coils decreasing rearwardly.

8. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices and formed of a vertical series of horizontal bars, a pair of horizontally-disposed conveyer-shafts disposed one over the other and alongside said fence in horizontal planes between those of bars of said fence, helical conveying-coils carried by said shafts and having their peripheries projecting to and between the fence-bars, and mechanism connecting the conveyer-shafts with supporting-wheels of the deck, the diameters of said helical coils decreasing rearwardly and the pitch of the helices decreasing rearwardly.

9. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices and formed of a vertical series of horizontal bars, a pair of horizontally-disposed conveyer-shafts disposed one over the other and alongside said fence in horizontal planes between those of bars of said fence, helical conveying-coils carried by said shafts and having their peripheries projecting to and between the fence-bars, and mechanism connecting the conveyer-shafts with supporting-wheels of the deck, said helical conveying-coils having their diameters decreasing rearwardly and having their helices formed with double-initial coils and single-terminal coils.

10. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices and formed of a vertical series of horizontal bars, a pair of horizontally-disposed conveyer-shafts disposed one over the other and alongside said fence in horizontal planes between those of bars of said fence, helical conveying-coils carried by said shafts and having their peripheries projecting to and between the fence-bars, and mechanism connecting the conveyer-shafts with supporting-wheels of the deck, said helical conveying-coils having rearwardly-decreasing diameters and having the pitch of their helices decreasing rearwardly and having their helices formed with double-initial coils and single-terminal coils.

11. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices, a horizontally-disposed conveyer-shaft disposed alongside said fence, a helical conveying-coil carried by said shaft and coöperating with said fence to carry the stalks rearwardly, cut-off bars pivoted at their forward ends and inwardly turned at their rear ends and disposed normally outwardly beyond said shaft but adapted to swing inwardly past the shaft and into engagement with said fence, devices for swinging said cut-off bars inwardly and outwardly, and mechanism connecting the conveyer-shaft with supporting-wheels of the deck.

12. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices, a pair of helical conveyers disposed horizontally one over the other alongside said fence, cut-off bars pivoted at their forward ends and inwardly turned at their rear ends and disposed normally outwardly beyond the shafts of said conveyers but adapted to swing inwardly past said conveyers and into engagement with said fence, devices for swinging said cut-off bars inwardly and outwardly, and mechanism connecting said conveyers with supporting-wheels of the deck.

13. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices and adapted to have its rear end swing transversely, a helical conveyer disposed horizontally alongside said fence and coöperating therewith to carry the stalks rearwardly, cut-off bars pivoted at their forward ends and having their rear ends inwardly turned and standing normally outwardly beyond the shaft of said conveyer but adapted to swing inwardly beyond such shaft and into contact with the rear end of said fence and move said fence inwardly, devices for swinging said cut-off bars inwardly and outwardly, and mechanism connecting the conveyer with supporting-wheels of the deck.

14. In a corn-harvester, the combination, substantially as set forth, of a wheeled deck, a cutter carried at the front of the deck, shock-supporting devices on the rear portion of the deck, a fence carried by the deck and extending rearwardly from the cutter to the shock-supporting devices and having its rear portion transversely flexible, a pair of helical conveyers disposed one over the other alongside said fence and coöperating therewith to carry the stalks rearwardly, cut-off bars pivoted at their forward ends and having their rear ends inwardly turned and standing normally outwardly beyond the shafts of said conveyers but adapted to swing inwardly beyond said shafts and against said flexible fence and move the fence farther from the conveyers, devices for swinging said cut-off bars inwardly and outwardly, and mechanism connecting the conveyers with supporting-wheels of the deck.

15. In a corn-harvester, the combination, substantially as set forth, of a deck having a horizontal front portion and a horizontal rear portion and a rearwardly-inclined intermediate portion and having angular notches in its front, cutter-blades forming a margin of each of said notches, shock-supporting devices on the rear portion of the deck, fences carried by the deck and extending from said notches rearwardly to said shock-supporting devices, helical conveyers disposed alongside said fences and coöperating therewith to carry the stalks rearwardly upon the inclined intermediate portion of the deck, and mechanism connecting said conveyers with supporting-wheels of the deck.

16. In a corn-harvester, the combination, substantially as set forth, with a deck, supporting-wheels therefor, cutters at the front of the deck, fences and conveying devices forming a pair of gullets extending rearwardly from the cutters, a fence disposed across the deck at the rear ends of said gullets and extending from gullet to gullet and forming the front wall of a bundling-chamber common to both said gullets, fences extending rearwardly from the rear extremities of the outer boundaries of the gullets and forming side fences for the bundling-chamber, gates pivoted at the rear extremities of said side fences and adapted to take position to close the rear ends of the gullets and to swing inwardly and rearwardly and outwardly to form together a yielding rear wall entirely across the bundling-chamber, and devices for yieldingly urging said gates to the rear ends of the gullets.

17. In a corn-harvester, the combination, substantially as set forth, with a deck, supporting-wheels therefor, cutters at the front of the deck, fences and conveying devices forming a pair of gullets extending rearwardly from the cutters, a fence disposed across the deck at the rear ends of said gullets and extending from gullet to gullet and forming the front wall of a bundling-chamber common to both said gullets, fences extending rearwardly from the rear extremities of the outer boundaries of the gullets and forming side fences for the bundling-chamber, gates pivoted at the rear extremities of said side fences and adapted to take position to close the rear ends of the gullets and to swing inwardly and rearwardly and outwardly to form together a yielding rear wall entirely across the bundling-chamber, and springs connected with said gates and urging them yieldingly to the rear ends of the gullets.

18. In a corn-harvester, the combination, substantially as set forth, with a deck, supporting-wheels therefor, cutters at the front of the deck, fences and conveying devices forming gullets extending rearwardly from the cutters, a fence disposed across the deck at the rear ends of said gullets and extending from gullet to gullet and forming the front wall of the bundling-chamber, fences extending rearwardly from the rear extremities of the outer boundaries of the gullet and forming side fences for the bundling-chamber, gates pivoted at the rear extremities of said side fences and adapted to take position to close the rear ends of the gullets and to swing inwardly and rearwardly and outwardly to form a yielding rear wall for the bundling-chamber, and friction-brakes coöperating with said gates to frictionally resist the movement of the gates away from the rear ends of the gullets.

19. In a corn-harvester, the combination, substantially as set forth, with a deck, supporting-wheels therefor, cutters at the front of the deck, fences and conveying devices forming gullets extending rearwardly from the cutters, a fence disposed across the deck at the rear ends of said gullets and extending from gullet to gullet and forming the front wall of the bundling-chamber, fences extending rearwardly from the rear extremities of the outer boundaries of the gullet and forming side fences for the bundling-chamber, gates pivoted at the rear extremities of said side fences and adapted to take position to close the rear ends of the gullets and to swing inwardly and rearwardly and outwardly to form a yielding rear wall for the bundling-chamber, friction-brakes coöperating with said gates to frictionally resist the movement of the gates away from the rear ends of the gullets, springs connected with said gates and urging them yieldingly to the rear ends of the gullets, and devices for temporarily releasing said brakes and permitting the gates to move under the influence of said springs.

20. In a corn-harvester, the combination, substantially as set forth, with a wheeled deck, cutters at the front thereof, fences forming a bundling-chamber at the rear of the deck, supporting and conveying devices to serve in carrying the stalks from the cutters rearwardly to the bundling-chamber, trap-doors forming the floor of the bundling-chamber, of pivoted gates forming a yielding rear wall for the bundling-chamber, friction-brakes coöperating with said gates and frictionally resisting their rearward motion, bolts normally supporting the trap-doors in closed position, a counter-shaft disposed across and below the deck, releasing-rods connecting said brakes with arms on the rock-shaft, connections from said bolts to arms on the rock-shaft, and a foot-lever connected to an arm on the rock-shaft.

21. In a corn-harvester the combination, substantially as set forth, with a deck, devices for cutting and conveying rearwardly the cut stalks, fences and yielding gates forming a bundling-chamber, brakes to resist the yielding of said gates, trap-doors forming the floor of the bundling-chamber, bolts for latching said trap-doors in normal closed position, and swinging cut-off bars for interrupting the passage of stalks to the bundling-chamber, of a foot-lever mechanically connected with and serving to operate said cut-off bars, a secondary lever pivoted to the deck and carrying at its foot the pivot of oscillation for said foot-lever and mechanically connected with said brakes and latches, a spring urging the lower ends of the foot-lever and secondary lever forward and a spur carried by the secondary lever and adapted to be engaged on the forward movement of the foot-lever whereby the first forward movement of the foot-lever acts on the cut-off bars and the continued forward movement results in action on the brakes and latches.

JAMES A. MOORE.
    GEORGE COTNER.
    THOMAS J. OBENCHAIN.

Witnesses:
 JAMES A. COTNER,
 HARRY T. TOMLINSON.